Nov. 7, 1950 A. B. FOYE 2,528,507
CONTAINER SEALING COMPOSITIONS
Original Filed Aug. 9, 1947 2 Sheets—Sheet 2

Inventor
Allen B. Foye
By Theodore C. Browne
Attorney

Patented Nov. 7, 1950

2,528,507

UNITED STATES PATENT OFFICE 2,528,507

CONTAINER SEALING COMPOSITIONS

Allen B. Foye, West Bridgewater, Mass., assignor to Dewey and Almy Chemical Company, North Cambridge, Mass., a corporation of Massachusetts Original application August 9, 1947, Serial No. 767,835. Divided and this application May 11, 1949, Serial No. 92,720

4 Claims. (Cl. 260—28.5)

This invention relates to compositions suitable for sealing containers and is a division of my application entitled "Container Sealing Compositions," filed August 9, 1947, Serial Number 767,835.

When compared with the manufacture of metal parts, blown glass manufacture is a highly inaccurate process. In consequence, the sealing of glass containers presents more exaggerated problems than those which exist in the metal container closure art. The seals must have considerable mass to compensate for the inherent inaccuracy of the glass parts. It is the large mass of composition necessary to form an effective gasket which differentiates the art of making separable closures for glass or metal containers from tin can manufacture. In the latter art, a small amount of liquid sealing composition is applied by pneumatic pressure to the channel of the can end as it rotates on a chuck beneath the nozzle. The dry weight of a lining for a #2 tin can varies from 40 to 80 mg. distributed around a 10½" periphery. After lining (the process in which the sealing material is applied to the end of the can), the ends are dried, and then the thin film of dried sealing composition is compressed between two comparatively accurate metal parts as they are rolled together into the characteristic permanent double seam of a "sanitary" can. This art is known as the "flowed in" process.

The intrinsic economies of the flowed in process are not realized in the manufacture of glass closures because of the amount of sealing material which must be used; for example, the common screw cap such as used on mayonnaise and peanut butter jars having a peripheral dimension of but 7.85" requires about one gram of sealing composition. Preformed rubber rings are still widely used. It requires much labor or expensive, specialized equipment to insert the rings in the closure; yet this practice still remains in an economic competitive position because of the expense of flow-lining a large mass of liquid compound and then drying the compound to a solid state. Additionally, the productivity of the flowed in process when applied to glass closures is low because the machines handle fewer glass closures than can ends during the same time, and because glass closures must remain in the dryer for 1½ to 2 hours or more to dry the thick deposit which is necessary to seal a glass jar.

If the whole liquid mass could be converted into a solid and if it were not necessary to employ solvents or volatile suspending fluids, glass closure lining machines could run faster, for less material would have to be handled in any unit of time. And if, too, it were not necessary to evaporate from 30 to 50% of the liquid mass, the drying operation could be shortened or eliminated. The manufacture of glass closures could then be nearly as rapid and nearly as inexpensive as is the manufacture of lined sanitary can ends.

I have discovered that it is possible to produce a sealing material for use on glass or other closures with the following new characteristics. It can be converted from a liquid to a rubber-like sealing solid without loss of volume. It can be lined without throwing or spattering. It will stay in position on the closure throughout the manufacturing operation. It may be immobilized against flow at the fluxing temperature or may be given precisely controllable flow characteristics. It may be reinforced against cutting. It will neither settle nor cake on storage, and will produce uniform gaskets.

Generally, I secure these results by modifying the familiar "paste-resin" compositions which consist of a finely divided resin suspended in a liquid plasticizer in which the resin is insoluble at room temperature (68° F.) but soluble at some higher temperature. To these, I add reinforcing fillers together with a congelation agent. This combination produces a stiff, pasty gel at room temperatures. At moderate temperatures, however, (90° to 150° F.) the congelation agent melts, and under appropriate pressure, for the compositions are often thixotropic, it becomes a free-flowing colloidal liquid. When it is heated to still higher temperatures up to, for example, 350° F., the composition "fluxes," i. e., the resin dissolves in the plasticizer and, when cooled, it is thereafter a permanent rubbery mass.

Thus, the material goes through a series of physical transformations: (a) It is first a solid, paste-like, congealed mass at room temperatures; (b) it becomes a free-flowing liquid when passing through the nozzle, but is unfluxed; i. e., the resin is not yet dissolved in the plasticizer; (c) it hardens or recongeals on contacting with the cooler metal closure; (d) it becomes a solution upon being heated to a temperature high enough to cause the resin to dissolve in the plasticizer, and (e) finally, on subsequent cooling, it becomes a solid, tough, rubbery, permanent mass. These successive physical changes which take place at different temperature levels make the following manufacturing procedure possible.

A small amount of the congealed composition is continuously withdrawn from a reservoir and heated to the moderate temperature range where the material becomes liquid. The liquid is discharged under pressure through a heated nozzle onto blank closures as they pass through a conventional glass closure lining machine. On touching the cool closure blank the composition congeals or freezes at once and so remains exactly where it is placed on the closure despite all machine forces tending to dislodge it and jolts from the forwarding or transfer mechanism of the machine. Then, the lined closures pass into a hot oven where, in a few seconds or a few minutes (depending upon the type of oven) the congealed paste is fluxed. It is finally cooled and then becomes a permanent, rubbery, sealing gasket.

In the accompanying drawings.

Figure 11:
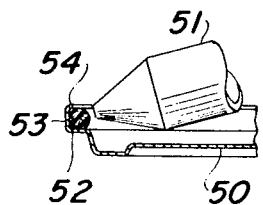
Figure 12:
Figure 13:
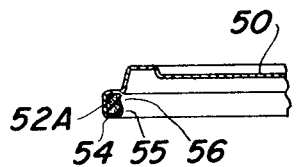

The flexibility of this composition is illustrated in Figures 11, 12 and 13.

Figure 11 shows a thixotropic compound being inserted in the side seal portion 53 of a popular commercial closure 50. The nozzle 51 is adjusted to place the compound 52 on the shoulder and beneath the small inturned flange 54 which forms the outer margin of the closure.

When the closure is passed through the fluxing oven face side uppermost, as illustrated in Figure 12, the sagging action of the compound causes it to assume a configuration as shown in this cross-sectional view of the cap and the finished gasket.

When the closure is run through the fluxing oven face side downwards as shown in Figure 13, the sagging action of the compound causes it to assume the configuration 52A as shown in this cross-sectional view of the cap and completed gasket.

Closures as shown in Figure 12 are used on jars having an angular glass finish.

Closures as shown in Figure 13 are used on jars having a beaded or cylindrical glass finish. In addition, the latter type allows the housewife to reseal the jar since the cap is held on the jar by the inwardly directed thrust of the material 52A in the sagged band as indicated at 55, resulting from the distortion of the material toward the hollow zone 56 when the closure is forced on the jar.

The characteristics of the compound thus make it possible to form two useful types of closures from a single compound and a single design of the metal part.

Three physical factors are responsible for the results already outlined; congelation, type of filler, and resin viscosity control. For clarity, I shall discuss each and the functions each performs in the combination separately.

First, the congelation element of my combination modifies the resin-plasticizer dispersion and causes the congelation of the whole mass not far from but safely above room temperatures. The compositions are solids, or at least stiff gels, during shipment to and storage at the closure plant. The congelation agent also prevents splashing and throwing of the composition under the centrifugal force by the lining machine. It stops the lining running out of position when the closures are inspected or handled and prevents settling and caking of the ingredients of the composition during shipment and storage.

A considerable number of substances are useful for this purpose. Petroleum hydrocarbons such as paraffin wax, long-chain alcohols such as stearyl and cetyl alcohols, and glycerides such as japan wax have particular merit. I have found that such substances unexpectedly reduce the viscosity of the composition when it is heated to between 90 and 150° F. and flatten the viscosity-temperature curve and enlarge the temperature range in which fluidity exists.

To show the effect of congelation agents, the following compositions were prepared and their characteristics measured. These characteristics were plotted in equal scale units on the abscissa and ordinate and represent respectively changes of 10° F. and 1000 centipoises. The graph is reproduced in Figure 1.

Figure 1:
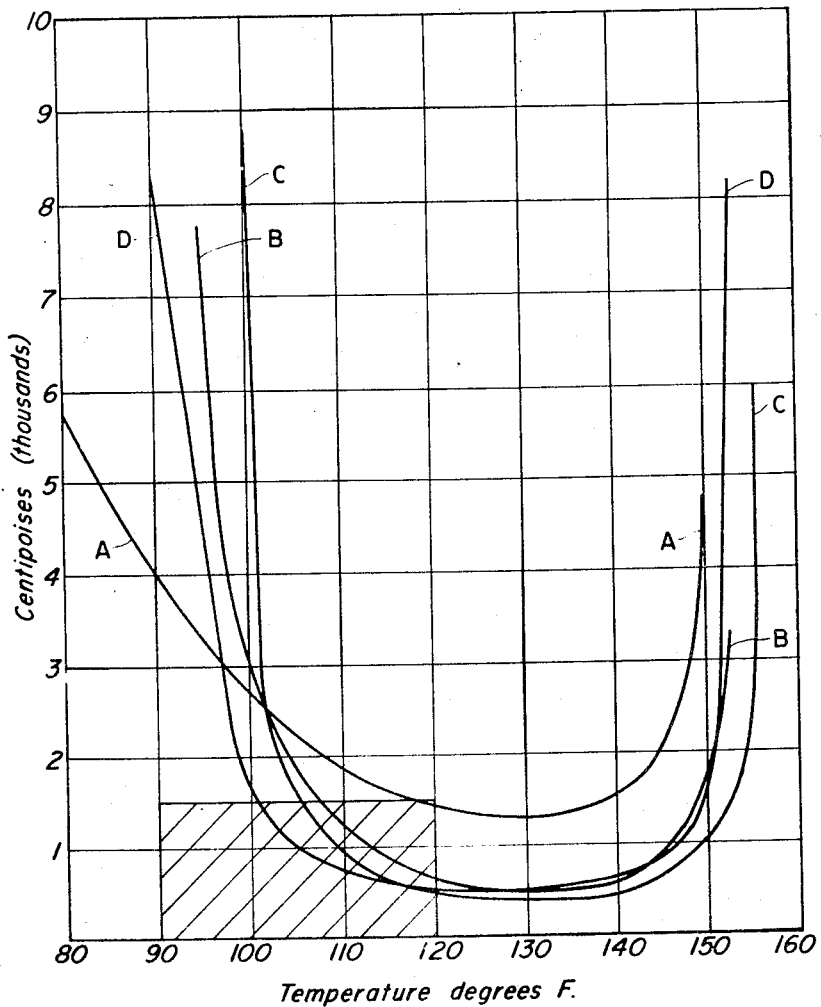
Figure 1 is a graphical presentation of the viscosity-temperature relation exhibited by the new compositions, with temperature as the abscissa and viscosity (centipoises) as the ordinate.

*Compositions of Figure 1*

| | Parts by Weight | | | |
| --- | --- | --- | --- | --- |
| | A | B | C | D |
| Vinyl chloride-vinyl acetate (97-3) | 200 | 200 | 200 | 200 |
| Dioctyl phthalate | 280 | 280 | 280 | 280 |
| Zinc resinate | 3 | 3 | 3 | 3 |
| Tributyl phosphate | 20 | 20 | 20 | 20 |
| Barytes | 400 | 400 | 400 | 400 |
| Paraffin wax (M. P. 125° F.) | | 36 | | |
| Stearyl alcohol | | | 45 | |
| Cetyl alcohol | | | | 45 |

As shown by Curve A of Figure 1, the viscosity curve of a composition without a congelation agent slopes downward gradually as the viscosity decreases with increase in temperature. With the addition of a congelation agent, as shown by curves B, C, and D of Figure 1, the viscosity is very high at room temperature and somewhat above, but at a point between about 90 and about 110° F. the curve drops sharply, almost vertically, to a minimum viscosity less than the lowest range of curve A. Over the temperature range from the sudden change in direction of the curve to about 150° F., the curves B, C, and D are flat, i. e., the viscosity remains practically constant despite temperature variations. In the steep drop of the curve, the viscosity of the composition falls at least 500, and in many cases as much as 5000 centipoises per degree Fahrenheit. By contrast, the viscosity-temperature curve A of a composition containing no congelation agent shows a fall of 250 centipoises at the most, and on the average about 100 centipoises per degree Fahrenheit.

Thus the congelation agent keeps the composition in a buttery, stiff, plastic condition at low temperatures (below about 90° F.), but allows it to become suddenly fluid and usable at the temperature of the sharp drop in the curve. Immediately upon application to the closure, the slight decrease in temperature caused by chilling the composition on contact with the cooler closure is sufficient to reestablish the non-fluid condition and restore the comparative rigidity of the compound almost instantly.

The compound is applied to the closure on standard lining machines except that the supply line and the lining nozzle must be heated to the liquifaction temperature of the congealed compound.

A closure lining machine places closures on a revolving chuck, spins them, applies the compound, strips them off the chuck and pushes them onto a take-off device at speeds as high as 250 closures a minute. At such speeds, liquids are thrown, spattered and displaced, but the character of my compositions is such that they solidify instantly on touching the closures and so prevent spattering and throwing.

The full benefits of the invention are realized, and the application of the compound by high speed closure lining machinery is made most efficient by choosing a congelation agent which imparts a temperature-viscosity characteristic similar to that illustrated by the curves B, C, and D of Figure 1. Curve C shows the viscosity, plotted against temperature, of a composition containing 5% stearyl alcohol. At 100° F. the viscosity as measured on a Brookfield viscosimeter is 8750 centipoises. At 105° F. its viscosity is 1250 centipoises; at 110° F. it is 760 centipoises. Substances which cause the congelation of the composition at room temperature, and permits its liquifaction at moderate higher temperatures, i. e., 90 to 150° F., will hereafter be referred to as "congelation agents."

Congelation agents produce the following effects upon my new composition:

1. A uniform dispersion congeals without significant separation of the ingredients. Thereafter, no settling, caking, or material separation of the ingredients takes place.

2. Filling and reinforcing materials are held rigidly suspended in the congealed matrix of the initial dispersion. Therefore, an extremely heavy, but otherwise very effective reinforcing agent like barytes, which would otherwise settle out, becomes practical.

3. When the heated (and hence fluid) material is placed on a cold cap, it congeals almost at once. Subsequent inspection and handling cannot dislodge the lining.

4. The composition is fluid over a wide range of temperatures, e. g., from about 105° F. to about 145° F., with no significant variation in viscosity; therefore fluctuations in temperature at the time of lining the closure have little effect on the volume of composition delivered in a unit time. Rigidity of the composition is reestablished with minimum drop in temperature.

The compositions have the following over-all advantages:

1. The lining machines can be run faster because (a) the compound is not thrown out of the closure; (b) since 100% liquid volume becomes 100% solid sealing volume, less compound must be applied to the closure at the time of lining.

2. Drying in the conventional sense is unnecessary. There is no water, volatile solvent, or suspending medium to be removed. To convert the mass from its original plastic condition to a rubbery substance, it is only necessary to bring it to a temperature sufficient to "flux" the compound (usually a 3 to 5 minute exposure to heat) and then cool it. If the heat be directed on the composition, as is done in a high-velocity hot air blast oven, fluxing can take place in a few seconds. Cooling after "fluxing" completes the process.

The congelation and viscosity effects of paraffin wax upon a compound are typical and are used as illustrative of the class. So that the effect of the congelation agent could be presented, no filler was added to the following example. A mixture was prepared composed of 280 parts of dioctyl phthalate
20 parts of tributyl phosphate
3 parts of zinc resinate
200 parts of a finely ground copolymer of vinyl chloride-vinyl acetate having monomeric proportions of approximately 97 to 3.

To this mixture, varying amounts of paraffin (M. P. 125° F.) were added. At 10% paraffin and above, the dispersion was a pasty solid at room temperature. As the proportions of wax were reduced its consistency fell first to a stiff mush and then to a non-flowing slush (at 2%). Viscosities were determined on a Brookfield viscosimeter. When a compound containing 10% wax was heated, the viscosity fell from 3180 cps. at 98° F. to 400 cps. at 111.5° F. and thereafter fell but 280 cps. in the range between 111.5 and 145° F. Curves for the values found for concentrations of 4% and above were similar and were rectangular in type. Curves for concentrations below 4%, although departing from the rectangular curve, showed, even at concentrations as low as 2%, marked reduction in viscosity at the same temperature and a much steeper rate of change in viscosity than that shown by the resin-plasticizer mixture alone.

The effect of the congelation agent on settling and caking is illustrated by the following test. Five samples were made up from the same basic formula, containing in parts by weight.

240.0 Polyvinyl chloride-acetate
3.6 Zinc resinate
24.0 Tributyl phosphate
480.0 Barytes (chosen for its high specific gravity)
336.8 Dioctyl phthalate Various amounts of paraffin wax were added to these samples ranging from 0% to 10% based on the weight of the whole composition. To the samples containing less than 10% paraffin wax, varying amounts of additional dioctyl phthalate were added. The purpose of the excess plasticizer was to adjust the viscosities of all the samples to approximately 350 cps., so that with viscosities of the compositions held constant, the effect on settling due to the wax alone could be determined. The specimens were allowed to stand at room temperature for one month; the results follow:

| Amount of Wax Added | | Amount Extra Plasticizer, Parts by Weight | Viscosity at 120° F. | Settling | Cake |
|---|---|---|---|---|---|
| Calculated as Weight Per Cent of Entire Composition | Parts by Weight | | | | |
| | | | Cps. | | |
| 0.00 | 0.00 | 144 | 361 | 30% clear serum | Hard, did not restir. |
| 2.28 | 27.8 | 92 | 360 | 20% clear serum | Soft, restirred easily. |
| 4.78 | 57.0 | 50 | 352 | 8% clear serum | Very soft, restirred immediately. |
| 7.25 | 87.9 | 45 | 348 | 0% | |
| 10.00 | 120 | 0 | 347 | 0% | |

The effect of the congelation agent reaches useful proportions at about 2% of the total composition. There is no maximum, but the physical characteristics of the gaskets become less desirable at wax concentrations above 10%, and at 25% tensile strength, elongation and penetration have such values that the composition may have no commercial significance. These values are not absolute. They vary with the specific congelation agent and the specific filler, but do represent average experience.

In place of paraffin, other materials which may be used as congelation agents with comparable results are Japan wax, long-chain alcohols such as stearyl and cetyl alcohols, and blended paraffins of various trade origins. These produce a sharp decrease in the viscosity of the composition when near their melting points and maintain the compound at a low viscosity throughout a wide temperature range.

Diglycol stearate, beeswax, polyamide wax, Candelilla wax, octadecenylamine, polyethylene glycol, and myristic acid, or the "amorphous" waxes, such as those extracted from lubricating oils, as opposed to crystalline waxes, cause the congelation of the composition and so prevent all settling of the ingredients, but they do not cause a sharp break in the viscosity-temperature curve, nor do they show a consistent low viscosity over a wide temperature range. For these reasons, they are not preferred for use in high-speed sealing compounds, but are useful in slower speed lining procedures.

Second: The choice and treatment of the filler is the second element of my combination which adapts the composition to specific manufacturing procedures and specific designs of closures. Three distinct effects on the heated, fluid composition may be imparted by fillers.

(a) Newtonian viscosity (i. e., systems in which increasing increments of pressure increase the rate of flow in direct proportion to the applied pressure).

(b) Thixotropy,* (i.e., systems in which any increasing force which exceeds a definite value known as the yield value increases the rate of flow disproportionately to the applied force).

(c) Dilatency (i. e., systems in which suddenly applied forces meet additional resistance and the rate of flow is not commensurate with applied force).

As a general statement, but subject to exceptions, crystalline fillers impart Newtonian viscosity. Barytes in dioctyl phthalate is typical. Stiffness and resistance to cutting may be given to the finished seal by adding fillers which impart Newtonian characteristics to the composition; yet the flow characteristics of the melted composition will not be affected. This is a valuable property in the manufacture of top seal channel closures,[1] which have a depressed channel or a holding ring pressed into the metal. When such a closure is lined and then placed gasket side uppermost in the fluxing oven, the compound melts and any irregularity in lining disappears, for the liquid seeks its own level and flows into a uniform ring.

I have found that, using the resins shown in the numbered examples, a weight-percent ratio of 55 resin 45 plasticizer produces a stiff scrape-on consistency just suitable for roll scraper operation. Consistencies suitable for nozzle lining machinery exist at weight-percent ratios of 50–50 and below. But ratios below 25 resin to 75 plasticizer are too soft for effective closure sealing. Other resins and other plasticizers will have different weight-percent ratio limits. The limits of weight-percent ratios for fillers cannot be given explicitly. A comparatively small proportion (8%) of hydrated calcium silicate, for example, will make a compound too stiff to work. Barytes, on the other hand, gives a workable compound at a weight-percent ratio of 80 filler to 20 resin. Most fillers lie between these limits. The limits, therefore, become practical limits. Filler can be added until the composition becomes too stiff to work.

I have discovered that a top seal lining can be formed in a flat top closure[2] provided that the composition be made so thixotropic that it will not flow under its own weight, even when molten. Generally, but again with exceptions, thixotropy may be imparted by plate-like fillers, such as clay in dioctyl phthalate, and by many others; hydrous magnesium silicate (fibrous), titanium dioxide, lithopone, etc. The yield value should be above that necessary to allow the fluid compound to flow under its own weight, but below that force necessary to push the composition through the nozzle. When such a composition touches the cooler closure, it becomes immobile because it congeals. It withstands jolts which impart displacement forces greater than its yield value because it is congealed; yet it will not flow when molten because its yield value is too high. Thining, spreading and running of the material while being fluxed is thus avoided.

A dilatency effect is desirable if the closures are carried through the fluxing oven by an intermittent mechanism so that it is advantageous to make the composition resistant to suddenly applied force. Alpha cellulose floc in dioctyl phthalate is typical. The compound stiffens as the rate of shear rises. Other fillers, particularly commercial forms of whiting frequently confer dilatency.

---

* Some text books confine the phenomenon of thixotropy to electrocratic systems and deny the term to organic dispersions where no ions exist. Inasmuch as a viscosimeter can perceive no such distinction and we are concerned herewith viscosity, I apply this well-understood term to a non-ionic system.

Figure 4:
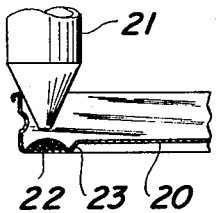
Figure 4 is a vertical section of a portion of a one-piece screw cap. The time condition is just subsequent to nozzle shut-off.
Figure 5:
Figure 5 is a partial section of the completed closure of Figure 4.
Figure 6:
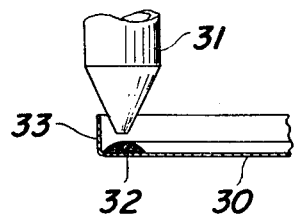
Figure 6 is a vertical section of a flat top closure also shown just subsequent to nozzle shut-off.
Figure 7:
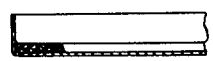
Figure 7 is a cross section of the completed closure of Figure 6.

[1] See Figures 4 and 5.
[2] See Figures 6 and 7.

Fillers cannot be grouped in fixed categories. Their concentration in the composition and the specific plasticizer seem to control. For example, barytes in dioctyl phthalate is Newtonian; in tri-cresyl phosphate it is somewhat dilatent. But the use of these properties, either separately or judiciously combined, is the means I employ to adapt the composition to the individualized requirements of the closure forming process.

Third: The third part of my combination is resin viscosity control. The essential quality of the resin is that it shall be relatively insoluble in the cold plasticizer and yet be highly soluble in the same plasticizer at elevated temperatures. Such resins are well known. It is now well recognized in the technology of "paste resins" that neither the chemical composition of the resin nor its molecular weight, nor the respective ratios of its co- or interpolymeric ingredients determine the ability of the resin to form a paste. For example, of two resins, identical both in polymeric ratios and molecular weights, one will be found to go into solution in the plasticizer at room temperature; the other will not dissolve to a significant extent and will form a "paste."

What determines the suitability of the resin to form a "paste" appears rather to be related to the condition of the resin at the surface of the resin particle, and, to a lesser degree, to the particle size of the resin. What this condition should be is not as yet well understood, but it is known that resins which are notoriously soluble in the plasticizer can be made insoluble in the same plasticizer by heating the finely divided resin in an inert suspending and heat transfer agent, for example, light paraffin oil. The specific plasticizer is obviously also involved, for one plasticizer or a mixture of plasticizers may dissolve the resin while another will not. Since the range of operative substances, both resins and plasticizers, has such extreme breadth, the test for suitability becomes a practical one. It is the solubility of the particular resin in the particular plasticizer at room temperature. If too much resin dissolves at this temperature, the composition becomes too syrupy for use. At the present time, my preferred resin is polyvinyl chloride especially prepared for paste formulations. Practically equal results may be obtained by copolymeric vinyl chloride-vinyl acetate in the approximate monomeric ratio of 97 to 3. This resin, also, is especially prepared for paste formulations. Both resins have sharply defined fluxing points. I use the term "paste-forming resin" in the specification and claims in the sense now customary in the art to describe a resin which will not solvate or gel in a specific plasticizer mixture to any material degree at 68° F., but which will solvate substantially completely at a higher temperature and will form a gel with the plasticizer upon cooling.

Because the amount of liquid sealing composition that can be placed on the cover is determined by the amount of composition that can be forced through a given orifice under a given pressure and during a given time, accurate liquid viscosity is a prerequisite for uniform closure production. The resin is very prone to exist in the plasticizer, not as individually dispersed particles, but as large agglomerates and, if these are too large, the viscosity of the compound may be erratic. Large agglomerates are prevented by wetting all ingredients thoroughly. This may be done by prolonged grinding, but I prefer to add tributyl phosphate or zinc resinate or preferably a mixture of both to a mixture of the filler and a portion of the plasticizer, grind this until it is well wetted and uniform, and then add the resin and pasticizer and finally the congelation agent and the remaining plasticizer and continue the grinding until fine grained uniformity is achieved. This practice minimizes the chance that large size resin aggregates will form. Other orders of addition and different manipulative procedures will produce operable results, but, at any event, some precautions to give the composition a stable and predictable viscosity should be taken.

Since the manufacture of a one-piece vacuum side seal closure is the most exacting, I shall describe this as my preferred example. A side seal is commonly used on jelly jars, jars for sandwich spreads, and ketchup bottles. It is characterized by a band of sealing material extending downwards along the neck of the bottle or rim of the jar at substantially right angles to the disc portion of the closure. One common method of making these closures is to insert a slice of tubed sealing stock in the depending skirt of the closure, then crimp the bead to hold the gasket.

EXAMPLE I

*Step 1*

| | Parts by weight |
|---|---|
| Barytes | 2,000 |
| Titanium dioxide } pigment | 72 |
| Carbon black } | 1 |
| Acid washed kaolin | 2,250 |
| Dioctyl phthalate | 2,000 |

Work on edge running mill until uniform.

*Step 2*

Add— Parts by weight

| | |
|---|---|
| Tributyl phosphate | 360 |
| 25% solution of zinc resinate in dioctyl phthalate | 216 |

Continue working to produce smooth blend.

*Step 3*

Add— Parts by weight

| | |
|---|---|
| Copolymeric vinyl chloride-acetate 97–3 ratio | 3,000 |
| Dioctyl phthalate | 1,000 |

Continue milling.

*Step 4*

| | Parts by weight |
|---|---|
| Paraffin (125° F. M. P.) | 400 |
| Dioctyl phthalate | 500 |

Melt together. Add hot to product of Step 3 when it is uniform. Raise temperature on mill to about 120° F.

*Step 5*

Add— Parts by weight

| | |
|---|---|
| Acid (phosphoric, maleic, benzoic, or other for plasticity adjustment of kaolin) | 100 |

Grind at 120° F. for one-half hour. The composition is then run into containers and allowed to cool. It congeals in the dispersed state, suspending the fillers and resin uniformly throughout its whole mass. At room temperature, it is a stiff paste-like solid.

Before the addition of acid and at 120° F., this composition exhibits a viscosity of 3000 centipoises at 60 R. P. M. (Brookfield viscosimeter) and has a viscosity of 11,000 centipoises at 6 R. P. M. After the addition of the acid, the same material at 120° F. exhibits a viscosity of 9600 centipoises at 60 R. P. M. and 44,000 centipoises at 6 R. P. M. At fluxing temperature (345° F. ambient) this material can sag reluctantly and will flow to a slight degree under its own weight.

The closures are lined as follows. Standard cap lining machines may be used if the nozzle, supply pipe and supply tank are heated and all parts of the heated system are maintained within 5° F. of the normal lining temperature.

Figure 2:
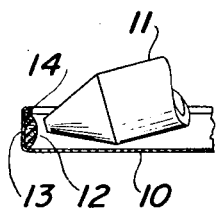
Figure 2 is a vertical section through a side seal showing the lining nozzle in elevation. This view represents the instantaneous condition just subsequent to nozzle shut-off.
Figure 3:
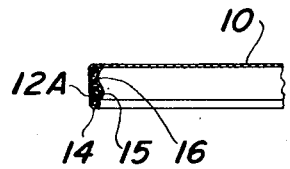
Figure 3 is a partial cross section through the finished side seal closure shown in Figure 2.

Figure 2 shows a vertical section through a one-piece side seal vacuum cap 10. The nozzle 11 is shown in elevation. It should be set at the correct angle to bank the composition 12 against the skirt 13. The skirt terminates in an open curl 14. Due to the congelation of the composition which occurs as soon as the composition assumes the position shown at 12, the closure may be turned over and placed on a tray. It is then placed in a fluxing oven maintained at 345° F. where, in 2 to 5 minutes, the controlled sag of the composition allows the composition (12—A, Fig. 3) to flow down the skirt 13, flow into and lock itself behind the open curl 14 and belly out slightly above the skirt to form the convex zone 15, and then flux to produce a permanent, rubbery solid ring. The closure is completed when cool.

When such a closure is forced down over a cylindrical side seal glass finish, the convex zone 15 is restrained radially by the skirt 13 and part of the gasket is pushed into the concave zone 16 gripping the glass tightly. This is a valuable reclosable device.

One-piece screw tops and band closures usually have a channel to retain the composition. Compositions for these may be made, for example, as follows:

EXAMPLE II

Step 1

| | Parts by weight |
|---|---|
| Barytes | 400 |
| Dioctyl phthalate | 157 |

Work on edge running mill.

Step 2

Add—

| | Parts by weight |
|---|---|
| Tributyl phosphate | 20 |
| 25% solution zinc resinate in dioctyl phthalate | 12 |

Continue working to produce smooth blend.

Step 3

Add—

| | Parts by weight |
|---|---|
| Vinyl chloride-vinyl acetate copolymer (97–3 chloride acetate ratio) | 200 |
| Dioctyl phthalate | 67 |

Continue milling, raise temperature of mix to 125° F.

Step 4

Add—

| | Parts by weight |
|---|---|
| Paraffin wax (M. P. 125° F.) | 37.5 |
| Melted into dioctyl phthalate | 47.0 |

Continue milling for substantial time at 115 to 125° F. Run the composition into containers and allow to cool. The viscosity at 110° F. is approximately 700 centipoises.

Such a composition is suitable only for closures having a channel or otherwise providing restraint against fluid flow. The closure 20 (Figures 4 and 5) illustrates the type. The same lining machine and the same lining conditions are used as described in Example 1, but the nozzle 21 is set in a vertical position which places the composition 22 in the channel 23 as shown. Since the composition is congealed when in the position shown, the closures may be inspected and handled as desired. They are placed in the fluxing oven for from 2 to 5 minutes at 345° F. with the lined side uppermost. As the temperature rises preliminary to fluxing, the composition becomes very fluid and flows. Flowing smooths out any lining irregularities.

EXAMPLE III

Step 1

| | Parts by weight |
|---|---|
| Dioctyl sebacate | 173.9 |
| Tricresyl phosphate | 173.9 |
| Zinc resinate | 3.6 |
| Polyvinyl chloride | 240.0 |
| Barytes | 482.0 |
| Paraffin wax | 45.0 |

Heat dioctyl sebacate, tricresyl phosphate and zinc resinate together to 225° F. with constant stirring until zinc resinate is wholly dissolved.

Step 2

Cool mixture of Step 1 to 150° F., then add paraffin wax, and stir.

Step 3

When wax is completely melted, add barytes. Stir 5 minutes.

Step 4

Reduce temperature to 120° F. Add polyvinyl chloride. Stir 10 minutes holding temperature at 120° F.

Step 5

Run mixture through submerged type colloidal mill at 120° F.

Step 6

Run the composition into containers and allow to cool.

At 90° F. the viscosity of this composition is 6000 cps. It is slightly thixotropic. The viscosity measurements taken on a Brookfield viscosimeter at 60 R. P. M. show that the viscosity drops from 6000 at 90° F. to 500 cps. at 117.5° F. The composition is used and lined as set forth in the directions for Example II.

EXAMPLE IV

Step 1

| | Parts by weight |
|---|---|
| Barytes | 2,000 |
| Acid-washed kaolin | 3,000 |
| Titanium dioxide | 72 |
| Carbon black | 1 |
| Dioctyl phthalate | 1,500 |

Work on edge running mill or ball mill until mixture is a smooth, uniform paste.

Step 2

Add—

| | Parts by weight |
|---|---|
| Tributyl phosphate | 360 |
| 25% solution of zinc resinate in dioctyl phthalate | 216 |
| Dioctyl phthalate | 860 |

Continue milling until blended.

Step 3

Add—                                            Parts by weight
Copolymer of vinyl chloride-vinyl acetate (97–3 chloride-acetate ratio) __ 3,000
Dioctyl phthalate _____ 1,000

Continue milling, raise temperature to 125° F.

Step 4

Add—                                            Parts by weight
Paraffin wax (M. P. 125° F.) melted
into dioctyl phthalate _____ { 400
                                       { 500

Continue milling at 115 to 125° F. for about one-half hour. Run the composition into containers and allow to cool.

This composition is extremely thixotropic. The following table shows the viscosities of the composition at 110° F., with varying applied force.

*Brookfield viscosimeter*

| Revolutions of Spindle per Minute | Viscosities, Centipoises |
|---|---|
| 0.3 | 850,000 |
| 0.6 | 520,000 |
| 1.5 | 230,000 |
| 3.0 | 140,000 |
| 6.0 | 82,500 |
| 12.0 | 45,000 |
| 30.0 | 29,000 |
| 60.0 | 21,500 |

Over substantial time intervals this and like compositions exhibit the property of "cold flow" above the congelation but not during the times that are involved in the steps of this process. No measurable flow can be found within the lapse of one-half minute. I use the words "will not flow," "prevent all flow," etc. in the specification and claims in this sense.

The high degree of thixotropy as shown by the above table makes possible the production of closures as shown in Figures 6, 7, 8 and 9. In manufacturing flat top closures as shown in Figure 6, the composition is directed into the closure and adjacent the skirt 33. The yield value of this composition is so great that a 66 mm. closure may be spun at 250 R. P. M. producing a force of approximately 2.2 G. without causing the composition to climb up the skirt. When the nozzle shuts off, the composition congeals immediately, and these closures may be transferred or inspected without danger of displacing the sealing ring. The composition will not flow when heated in the fluxing operation since its thixotropy is high enough to prevent all flow under its own weight. It fluxes to a rubbery ring, which adheres to the top of the closure as shown in Figure 7. By making the displacement value of the composition high (approximately 3 G.), closures may be made at reasonable speeds, and yet vibrations from the machine cannot displace the composition.

Figure 8:
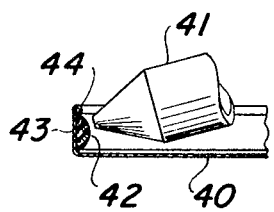
Figure 8 is a vertical section of a side seal closure just subsequent to nozzle shut-off.
Figure 9:
Figure 9 shows the same section at subsequent time after spinning on the chuck.
Figure 10:
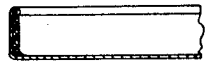
Figure 10 is the same cross section of the completed side seal closure of Figure 8.

The same composition may be used to produce the side seal closure illustrated in Figures 8, 9 and 10. The nozzle 41 is directed to place the composition 42 upon the skirt 43 of the closure 40. A speed of rotation is chosen sufficient to produce high enough centrifugal force to spread the composition out on the skirt 43 (500 R. P. M. produces a force of 8.96 G. on a 66 mm. closure). As the closure rotates, the composition flattens into a band which slides up the skirt and also downwardly toward the top of the closure to assume the general configuration shown in Figure 9. Again, when congealed or when heated in the fluxing oven, this material will not move.

Closures are fluxed by placing them in an oven having an ambient temperature of about 345° F. for from 2 to 5 minutes and then are allowed to cool. A cross section of the finished closure is illustrated in Figure 10. It will be observed that the composition, now a solid, rubbery ring, has the same configuration as the unfluxed composition shown in Figure 9.

These compositions exhibit the "rectangular" characteristics of curves B, C and D of Figure 1. The recommended lining temperatures, i. e., the temperatures of application, fall within the cross hatched area on the figure. For highest speed operation the lining temperature range should be held close to the knee of the curve so that congelation of the lining can take place with the minimum temperature change.

The above formulae and procedures have been given as preferred examples and are now considered preferable for dry- and hot-packed food products. For industrial products, however, the choice is much wider. Closures for products such as paints, insecticides, finishes and dressings do not demand plasticizers which are free from odor and, further, the toxic effect of the ingredients is of less importance. To save undue length, operative materials already tested are given in tabular form.

| Polymers | Congelation Agents | Plasticizers | Fillers | Wetting Agents |
|---|---|---|---|---|
| Polyvinylchloride<br>Polyvinyl - chloride acetate<br>Vinylidene chloride-acrylo - nitrile copolymer | Stearyl alcohol<br>Cetyl alcohol<br>Diglycol stearate<br>Myristic acid<br>Polyethylene glycol<br>Polyamide wax<br>Mixed long-chain amides<br>Octadecenyl amine<br>Paraffins<br>Paraffin blends sold under various trade names<br>Japan wax<br>Amorphous petroleum wax<br>Candelilla wax<br>Beeswax | Dioctyl phthalate<br>Dioctyl sebacate<br>Tricresyl phosphate<br>Dicapryl phthalate<br>Petroleum fractions high in aromatic and naphthenic hydrocarbons<br>Methyl acetyl ricinoleate<br>"Flexol 8N8" said to be 2,2'- (ethyl-hexaneamido) diethyl di (2-ethylhexanoate) produced by Carbide & Carbon Chemical Company<br>Mixtures of the above | Barytes<br>Fibrous magnesium silicate<br>Talc<br>Acid-washed Kaolin<br>Lignin<br>Finely ground calcium carbonate<br>Aluminum oxide<br>Slate dust<br>Alpha cellulose floc<br>Graphitic mica<br>Ground cork<br>Lithopone<br>Calcium silicate<br>Diatomaceous earth | Tributyl phosphate<br>Zinc resinate<br>Magnesium resinate<br>Sorbide dioleate<br>Gum rosin<br>Oil-free lecithin<br>Sodium petroleum sulphonate |

Glass closure lining machinery now operates at chuck speeds of from 225 to 280 revolutions a minute. The nozzle is open and projects compound into the closure during one or two revolutions, depending upon the thickness of the gasket it is desired to produce, and the lined closure is removed after spinning approximately one revolution after the lining nozzle is closed.

The present invention makes it possible to operate the same machine at chuck speeds as high as 356 to 700 R. P. M. I find that the composition is smoothed out against the skirt and that sufficient time is given for the mass of composition to congeal if the closure rotates on the chuck one revolution after the nozzle has closed. During that time congelation has progressed to such an extent that closures removed from the machine immediately after discharge from the chuck may be roughly handled without displacing the composition.

Although these compositions have been specifically designed for glass closures, which require comparatively thick sealing elements, they are obviously adapted for the sealing of containers requiring less sealing material, and can be used on closures for metal, paper, or plastic containers as well as for glass.

I claim:

1. A container sealing composition comprising at room temperatures a congealed mass of plasticizer and a wax-like congelation agent selected from the class consisting of an amide wax, octadecenylamine and myristic acid, having uniformly distributed therein discrete particles of filler and discrete particles of a resin selected from the class consisting of polymers of vinyl chloride and copolymers of vinylidene chloride and acrylonitrile which is paste-forming with the plasticizer, the resin being substantially unsolvated and insoluble in the plasticizer at room temperature but soluble in the plasticizer at temperatures above 150° F., said congelation agent constituting from 2 to 25% by weight of the composition, said composition being a flowable colloidal liquid at temperatures between room temperature and 150° F. and being convertible into a permanent rubbery mass by heating to a temperature above 150° F. at which the resin solvates in the plasticizer and thereafter cooling the composition to room temperature.

2. A composition as defined in claim 1 which is thixotropic at a temperature at which the congelation agent is molten, exhibiting no flow at a force of 1 G. for at least 30 seconds but being freely flowable under the application of a substantially greater force.

3. Composition as defined in claim 1 in which the resin is a copolymer of vinyl chloride and vinyl acetate.

4. Composition as defined in claim 1 which exhibits substantially Newtonian flow characteristics at temperatures at which the congelation agent is molten.

ALLEN B. FOYE.

REFERENCES CITED

The following references are of record in the file of this patent:

UNITED STATES PATENTS

| Number | Name | Date |
|---|---|---|
| 2,048,808 | Oenslager | July 28, 1936 |
| 2,181,481 | Gray | Nov. 28, 1939 |
| 2,396,125 | Price | Mar. 5, 1946 |
| 2,421,409 | Brookman | June 3, 1947 |

Certificate of Correction

Patent No. 2,528,507 November 7, 1950

ALLEN B. FOYE

It is hereby certified that error appears in the printed specification of the above numbered patent requiring correction as follows:

Column 6, line 49, strike out the word "curve"; line 69, for "diocetyl" read *dioctyl*; column 8, line 63, for "Thining" read *Thinning*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*